(12) United States Patent
Pletinckx et al.

(10) Patent No.: US 8,464,100 B2
(45) Date of Patent: Jun. 11, 2013

(54) SYSTEM FOR CHECKING A PROGRAM MEMORY OF A PROCESSING UNIT

(75) Inventors: Jo Pletinckx, Grossbottwar (DE); Hongyu Wang, Stuttgart (DE); Axel Wenzler, Rottweil (DE); Markus Brockmann, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 248 days.

(21) Appl. No.: 12/735,530

(22) PCT Filed: Nov. 27, 2008

(86) PCT No.: PCT/EP2008/066325
§ 371 (c)(1),
(2), (4) Date: Oct. 26, 2010

(87) PCT Pub. No.: WO2009/103372
PCT Pub. Date: Aug. 27, 2009

(65) Prior Publication Data
US 2011/0264963 A1    Oct. 27, 2011

(30) Foreign Application Priority Data
Feb. 21, 2008   (DE) .......................... 10 2008 010 233

(51) Int. Cl.
*G06F 11/00*    (2006.01)
(52) U.S. Cl.
USPC .................. 714/30; 714/25; 714/6.1
(58) Field of Classification Search
USPC ............................................... 714/30, 25, 42
See application file for complete search history.

(56) References Cited

U.S. PATENT DOCUMENTS

| | | | | |
|---|---|---|---|---|
| 5,894,549 A | * | 4/1999 | Cheng | 714/42 |
| 8,127,183 B2 | * | 2/2012 | Kamiya et al. | 714/48 |
| 2007/0083789 A1 | * | 4/2007 | Jung et al. | 714/1 |

FOREIGN PATENT DOCUMENTS

| | | |
|---|---|---|
| DE | 29 06 117 | 9/1980 |
| EP | 0 843 317 | 5/1998 |
| EP | 1 178 321 | 2/2002 |
| JP | 57-20996 | 2/1982 |
| JP | 62-107354 | 5/1987 |
| JP | 5-61692 | 3/1993 |
| JP | 11-15741 | 1/1999 |
| JP | 2002-163155 | 6/2002 |
| JP | 2007-26084 | 2/2007 |
| WO | WO 03/043022 | 5/2003 |

* cited by examiner

*Primary Examiner* — Scott Baderman
*Assistant Examiner* — Sarai Butler
(74) *Attorney, Agent, or Firm* — Kenyon & Kenyon LLP

(57) ABSTRACT

A system for checking a program memory) of a processing unit includes a check module, and the processing unit is made up of an instruction counter connected to the check module. The check module has a register connected to a first changeover switch that sets the register content. In a system that allows for the instruction addresses of the entire program memory to be checked, the instruction counter contains an ancillary counter, which runs through the instruction address space of the program memory independently of the program code during normal operation and which is connected to the register.

18 Claims, 2 Drawing Sheets

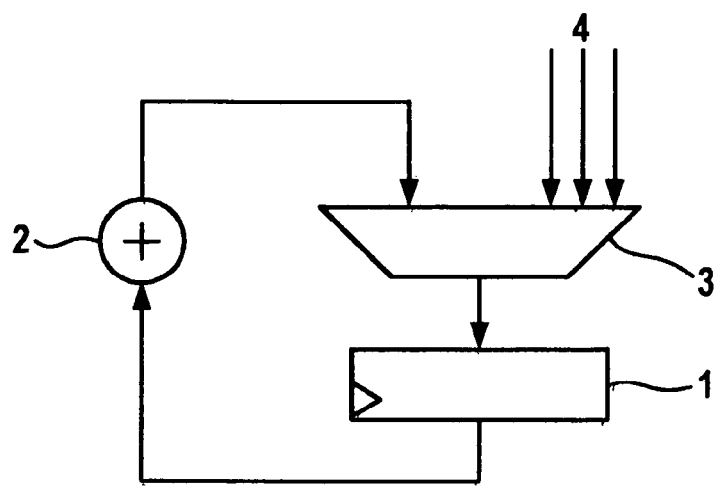
Fig. 1
Fig. 2
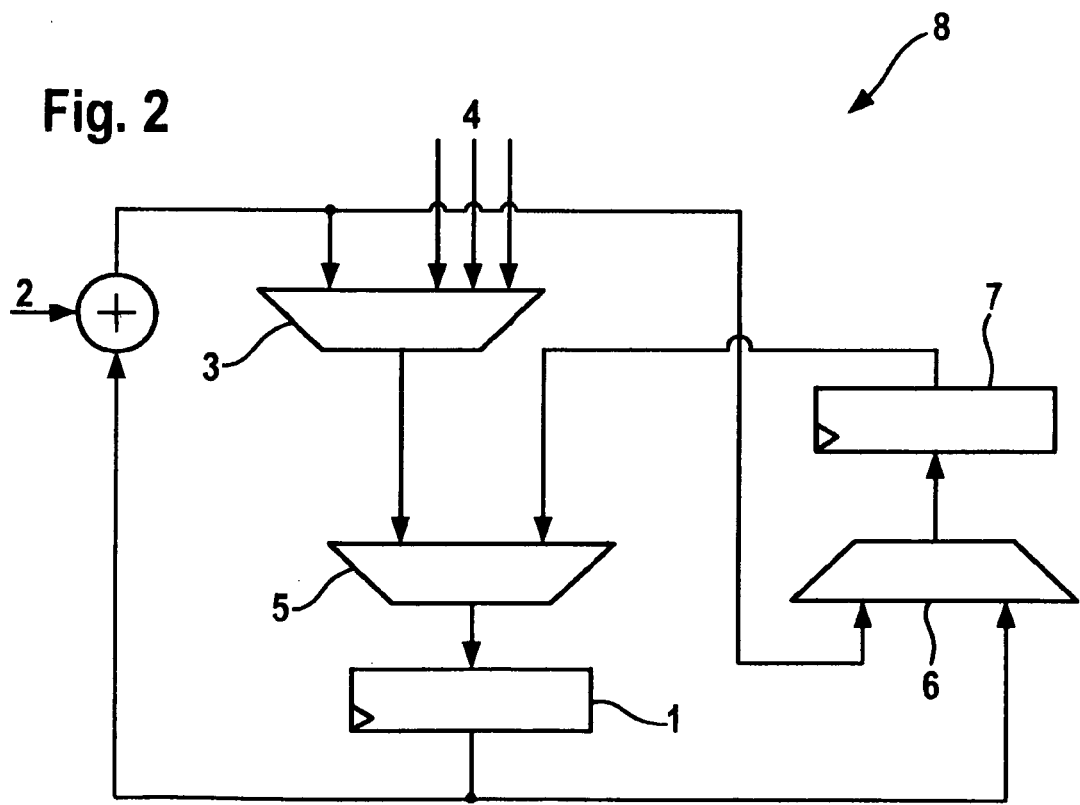

SYSTEM FOR CHECKING A PROGRAM MEMORY OF A PROCESSING UNIT

BACKGROUND OF THE INVENTION

1. Field of the Invention

The present invention relates to a system for checking a program memory of a processing unit having a check module, the processing unit being made up of an instruction counter connected to the program memory, which has a register and the register is connected to a first changeover switch that sets the register content.

2. Description of Related Art

In the area of motor vehicle technology, the number of applications that are critical with respect to safety is growing constantly. At the same time, the complexity and the safety requirements of the circuits used in the motor vehicle technology are rising as well. This applies especially also to the hardware-specific circuits (ASIC). Meanwhile, the demands for checking the safety-related components are increasing. Thus it is also necessary to check the program codes that are integrated in a circuit or stored in an external memory and are used to execute safety-related applications.

Because conditionally executable jump instructions are able to influence the program run in a processing unit, preferably a processor core, the instruction flow at the output of the program memory is not always deterministic. This means that there exists no definite relation between input data and output data. Thus certain instruction addresses of the program memory are always addressed, while others are addressed only in a certain mode. For this reason, the program code cannot be verified by an efficient data block-based or data flow-based check mechanism.

BRIEF SUMMARY OF THE INVENTION

The present invention provides a system that allows for the instruction addresses of the entire program memory to be checked.

The advantage of the present invention is that the external check module is able to check the entire content of the program memory in a previously specified known order using an error detection method. For this purpose, the instruction counter contains an ancillary counter, which runs through the instruction address space of the program memory independently of the program code during normal operation and which is connected to the register. The provided structure allows for the entire content of the program memory to be monitored efficiently during normal operation. As required, the monitoring operation may also be performed periodically. The periods in which the checks are to be performed may be varied at will. The present invention is able to operate with the most diverse error detection methods.

All instruction addresses of the program memory are checked, even such as in a normal program run are addressed only in certain modes and are otherwise skipped.

Since some structures already present in a processor core, such as for example the address decoder and output driver of the memory, are reused, these are also tested indirectly for errors.

Advantageously, the ancillary counter has a second changeover switch, which exchanges the data between an intermediate memory and the register and which is connected to the register via the intermediate memory. By the mere expansion of the instruction counter, the hardware expenditure in terms of chip surface is thus reduced to a minimum since already existing parts of the instruction counter are also used for the ancillary counter.

In a further development of the present invention, for the purpose of checking the program memory, the second changeover switch is able to load the content of the register corresponding to the current program run into the intermediate memory, it being possible to overwrite the register with the instruction address to be checked. Changing the contents of the register and the intermediate memory makes it possible in a simple manner to interrupt the normal program run and to start the check mode. The current value of the register reached during the normal program run is stored temporarily for this purpose. The check thus interrupts the program run, but does not change it.

In one development, it is possible to transmit the content corresponding to the current program run back from the intermediate memory into the register following the execution of the check. By loading the temporarily stored value of the normal program run back into the register, the program is continued at the point at which it was interrupted.

In one development, the register leads to an adder, which increases the instruction address to be checked by a specified value following the execution of the check and which is connected to the second changeover switch, which stores the instruction address increased by a specified value in the intermediate memory. This has the advantage that in parallel to overwriting the register with the current value of the normal program run, the adder selects the next desired instruction address to be checked, which is stored in the intermediate memory. The value selected by the adder may be selected in linear fashion or according to another specified rule.

If then the next command for starting the further check occurs, the normal program run is interrupted as already described and the next instruction address of the program memory to be checked is loaded from the intermediate memory into the register.

For this purpose, the adder represents an element of the system that is used both in the execution of the normal program code as well as in the check mode for the instruction addresses of the program memory.

The expanded instruction counter advantageously allows for the previously described execution in the time-division multiplex method. Since the structure operates in the time-division multiplex method, a simple and cost-effective memory module such as a "single port" memory module may be used for example. Such a memory module has only one address input and one data output, which suffices for the described process since the normal execution of the program code and the check are performed successively in time.

In one development, the instruction counter is connected to the external check module via a signal line for transmitting the instruction address to be checked. The structure according to the present invention is thus particularly advantageously suited for computer architectures, in which the program memory is not connected to a databus since a simple signal line suffices for communication between the instruction counter and the check module.

In order to monitor the execution of a complete check of the program memory, the external check module detects the start and the end of the check of the program memory. This occurs by comparing the applied instruction address to a value stored in the check module.

If the size of the program memory is not a power of two, an initialization back to a start value must occur after a complete check of the intermediate register. For this purpose, the signal line between the external check module and the instruction counter is developed bidirectionally.

Alternatively, the instruction counter detects the start and the end of the check of the program memory. The start and the end of the complete check of the program memory are then communicated to the check module via a signal line. The check of the instruction address in the external check module is eliminated. Advantageously it is thus possible to save chip surface.

In one development of the present invention, the instruction counter is connected to an instruction decoder controlling the memory check. The control operation of the check of an address content (memory space) of the program memory check is started by a special software instruction and runs automatically under the control of the instruction decoder. This makes it possible in a simple manner to keep the duration of a complete check of the program memory content variable. Differentiating the duration may depend on the security-related requirements of the concrete application.

In another consideration, it may be necessary in an initialization phase for the check of the program memory to be performed in only a few milliseconds in order to ensure that the application to be started is also working reliably. In this situation, the software instruction for starting the check of the program memory is repeated often. Following the conclusion of the initialization phase, it suffices if the check occurs only within several seconds. This procedure may also be guided by the desire to keep the power consumption as low as possible.

BRIEF DESCRIPTION OF THE SEVERAL VIEWS OF THE DRAWING

FIG. 1 shows an instruction counter according to the related art.

FIG. 2 shows an exemplary embodiment of the instruction counter according to the present invention.

DETAILED DESCRIPTION OF THE INVENTION

Figure 3:
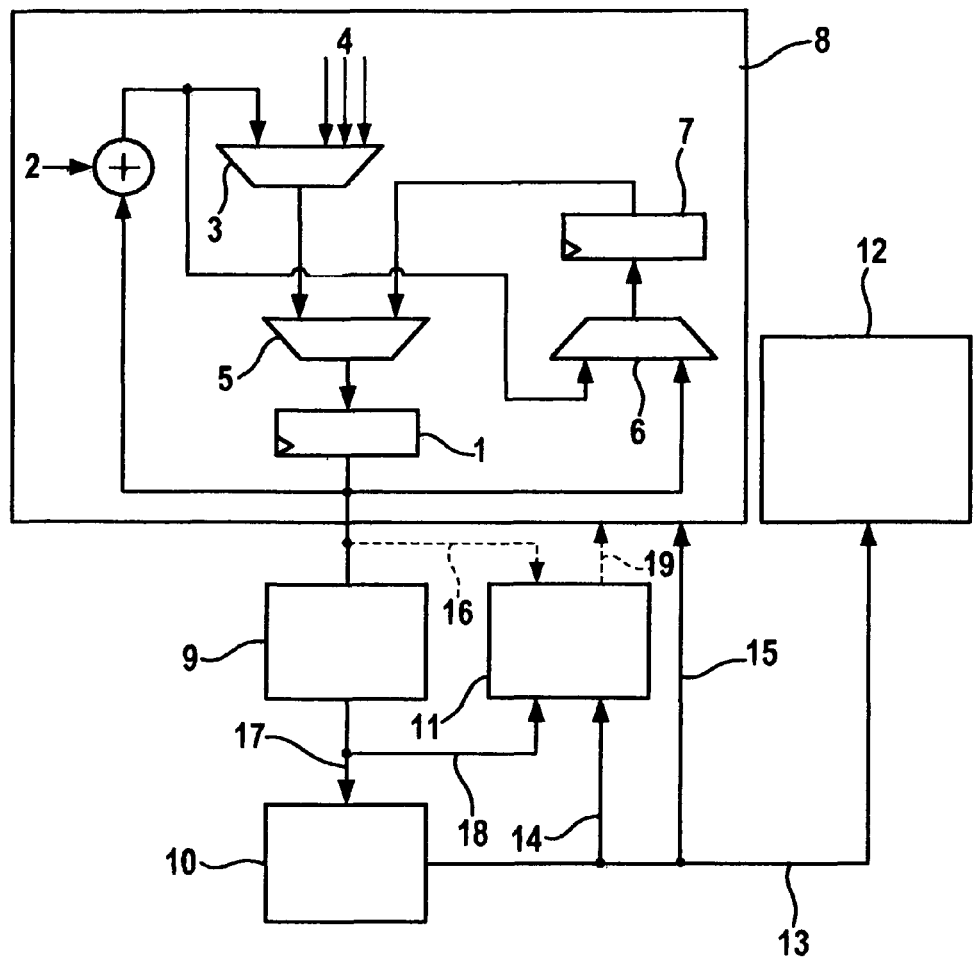
FIG. 3 shows a view of a system according to the present invention.

FIG. 1 shows an instruction counter, as it is known from the related art in a processor core. The instruction counter is made up of a register 1 having the word length N. The content of register 1 acts as an address in the program memory. Register 1 is connected to an adder 2, which increases the content of register 1 by one following each instruction. Adder 2 and an external instruction decoder module not represented further in FIG. 1 lead to a first multiplexer 3, which in turn is connected to register 1. To be able to control the program run, the register content increased by one by adder 2 is again supplied to register 1 via first multiplexer 3. The register content may also be set from outside by the external instruction decoder module, which is represented by inputs 4 on first multiplexer 3. This control operation also occurs via first multiplexer 3.

In order to be able to check the program memory, the complete address space must be run through once. Since the program run may be influenced by jump instructions determined from outside, an ancillary counter is used, which runs through the address space independently of the program code of the program memory to be checked following a linear or another rule to be specified. For implementing the ancillary counter, the instruction counter known from the related art is expanded such that some already existing hardware elements may be used as well.

The expanded instruction counter is represented in FIG. 2. Register 1 is connected on the one hand via adder 2 to first multiplexer 3, which leads via a second multiplexer 5 back to register 1. On the other hand, register 1 is connected to a third multiplexer 6, which leads to an intermediate memory 7. Intermediate memory 7 is in turn connected to register 1 via second multiplexer 5. Adder 2 is additionally connected to third multiplexer 6.

In this setup it is also possible for the register content to be set by an external instruction decoder module, indicated by the inputs 4 on first multiplexer 3, via first multiplexer 3 and second multiplexer 5. Preferably two N-bit 2-to-1 multiplexers are used for first multiplexer 3 and third multiplexer 6.

Checking an instruction of the program memory typically includes three cycles:

First, the instruction to start checking a memory address of the program memory is decoded. This instruction is contained in the software of the normal program code and is thus read during the normal operation of the processing unit. After this instruction is decoded, the normal program operation is stopped. The content of register 1, which includes a memory address of the currently running program, is loaded via third multiplexer 6 into intermediate memory 7. Thus the current state of the program run remains stored.

At the same time, the content of intermediate memory 7, which corresponds to the memory address of the program memory to be checked, is loaded into register 1.

In a next step, the content of register 1 increased by one by adder 2 is stored again in intermediate memory 7 via third multiplexer 6. At the same time, the content of intermediate memory 7 is loaded via second multiplexer 5 into register 1. Since this content corresponds to the memory address of the instruction code, at which point the currently running program was interrupted, the normal program run may now be continued.

The content of register 1, again loaded into intermediate memory 7 and increased by one, now corresponds to the next memory address of the program memory to be checked, which is checked at the next instruction for starting the check of a memory address. According to this procedure, expanded instruction counter 8 switches back and forth between normal operation and the program memory check mode.

FIG. 3 shows a system view including the expanded instruction counter 8 explained in the present context. The program memory 9 to be checked is connected to an instruction decoder 10 and to external monitoring module 11. Instruction decoder 10 in turn leads directly to external monitoring module 11 and expanded instruction counter 8. In addition, instruction decoder 10 is connected to further modules 12 such as for example the RAM and ROM memory units or the arithmetic logic unit (ALU) of a process, to which it outputs control signals via signal line 13.

First, the system is executing a normal program specified by a program code that is stored in the program memory. If the instruction for starting the check of a memory address of program memory 9 is called as the next instruction, this is decoded by instruction decoder 10. Instruction decoder 10 transmits this information to check module 11 via signal line 14. In addition, expanded instruction counter 8 is also informed via signal line 15. The program run is interrupted by expanded instruction counter 8. Expanded instruction counter 8 operates in the manner described in that it exchanges the contents between register 1 and intermediate memory 7. The memory address to be checked in register 1 is communicated to external check module 11 via signal line 16. The memory address to be checked may also be used in addition to the program memory content as a value to be checked. In addition, program memory 9 is requested to call up the instruction associated with this memory address. Via signal line 17, the instruction is transmitted to instruction decoder 10 and via signal line 18 to check module 11. Check module 11 accepts the instruction to be checked that is applied at this point in time and compares it using an error detection program. If the instruction itself cannot be checked for an error, but only the entire memory or memory areas, then the memory is checked. A common check method is to form a checksum over the entire memory.

Once this check is completed and the contents of register 1 and intermediate memory 7 have been exchanged again such that the memory content corresponding to the normal program is again present in register 1, the normal program run is resumed.

This operation may be repeated at any time in that it is called up again by another instruction for starting the check of an instruction address of program memory 9. In this manner, the operation is repeated until the entire address space of program memory 9 is run through and all memory spaces have been examined. The result of the verification is subsequently transmitted by instruction decoder 10 to a higher-order control unit (not shown), where it is evaluated.

The start and end of a complete check of program memory 9 is determined in external check module 11. For this purpose, external check module 11 compares the applied memory address with a value stored in check module 11. This occurs whenever a check operation is active. For this purpose, a first value identifies the first address of program memory 9, that is, the start of the check, while a second value detects the last address of program memory 9 and thus the end of a complete check of the address space of program memory 9.

If the size of the memory is a power of two, then the determination of the start and end of a complete check of the program memory may be omitted entirely. An overflow occurs if the value of the intermediate memory reaches the end of the address space. In the next check cycle, the value of the intermediate memory is automatically initialized to zero by this overflow.

If the size of program memory 9 is not a power of two, intermediate memory 7 must be initialized again to a start value after a complete check of the address space of the program memory. This occurs via signal line 19 from check module 11 to expanded instruction counter 8. If the size of program memory 9 corresponds to a power of two, then the initialization of intermediate memory 7 is not necessary and the signal line may be omitted.

The described design approach is particularly well suited for evaluation circuits for rate-of-rotation and acceleration sensors.

What is claimed is:

1. A system for checking a program memory of a processing unit, comprising:
  an instruction counter connected to the program memory, wherein the instruction counter includes:
    a register connected to a first changeover switch configured to set the register content; and
    an ancillary counter connected to the register and configured to run through instruction address space of the program memory independently of program code during normal operation;
  wherein the ancillary counter includes a second changeover switch exchanging data between an intermediate memory and the register, wherein the second changeover switch is connected to the register via the intermediate memory.

2. The system as recited in claim 1, wherein the second changeover switch is configured to load the content of the register corresponding to the current program run into the intermediate memory for the purpose of checking the program memory.

3. The system as recited in claim 2, wherein after the execution of the check of the program memory, the content corresponding to the current program run is transferred back from the intermediate memory into the register.

4. The system as recited in claim 2, wherein the register is connected to an adder configured to increase the instruction address to be checked by a specified value following the execution of the check, the adder being connected to the second changeover switch, and wherein the second changeover switch is configured to store the instruction address increased by the specified value in the intermediate memory.

5. The system as recited in claim 2, wherein at least one of the first and second changeover switches facilitates the program run in time-division multiplex method.

6. The system as recited in claim 1, wherein the instruction counter is connected via a signal line to a check module for transmitting the instruction address to be checked.

7. The system as recited in claim 6, wherein the check module detects the start and the end of the check of the program memory.

8. The system as recited in claim 6, wherein the signal line transmits information bidirectionally.

9. The system as recited in claim 6, wherein the instruction counter detects the start and the end of the program memory check.

10. The system as recited in claim 9, wherein transmission of the start and the end of the program memory check from the instruction counter to the check module occurs via the signal line.

11. The system as recited in claim 1, wherein the instruction counter is connected to an instruction decoder controlling the program check.

12. A method for checking a program memory in a computation unit using a checking module, comprising:
  reading an instruction for starting the check on the program memory during a normal mode of the computation unit;
  in response to a stop of the normal mode of the computation unit, decoding the instruction by an instruction decoder in the computation unit, the instruction being part of a program that is executed during the normal mode;
  loading, into an intermediate memory, a content of a register having stored thereon a memory address for the program being executed and loading, into the register, a content of the intermediate memory which corresponds to a memory address that is to be checked for the program memory;
  transmitting the memory address to be checked from the register to a check module;
  forwarding the instruction to be checked associated with the memory address to be checked from the program memory to the check module;
  incrementing, by an adder, the content of the register by a predetermined value and storing the content of the register into the intermediate memory;
  loading the content of the intermediate memory into the register; and
  resuming the normal mode of the computation unit.

13. The method of claim 12, wherein the check module is configured to check at least one of the instruction to be checked, a portion of the program memory, and the entire program memory.

14. The method of claim 13, wherein a start and an end of the check on the program memory are detected by the checking module.

15. The method of claim 12, wherein a start and an end of the check on the program memory are detected by the checking module.

16. A circuit arrangement for checking a program memory in a computation unit having at least one register and at least one intermediate memory, comprising:

arrangement for reading an instruction for starting the check on the program memory during a normal mode of the computation unit and for transmitting the instruction to an instruction decoder in the computation unit for decoding, the instruction being part of a program that is executed during the normal mode;

arrangement for, subsequent to the decoding of the instruction, starting the check by stopping the normal mode of the computation unit;

arrangement for loading, into the at least one intermediate memory, a content of the at least one register which contains a memory address for the program being executed, and for simultaneously loading, into the at least one register, a content of the at least one intermediate memory which corresponds to a memory address that is to be checked for the program memory;

arrangement for transmitting the memory address to be checked from the at least one register to a check module;

arrangement s for forwarding the instruction to be checked associated with the memory address to be checked from the program memory to the check module;

arrangement for incrementing the content of the at least one register by an adder by a predetermined value and storing the content of the at least one register into the intermediate memory;

arrangement for loading the content of the intermediate memory into the at least one register; and arrangement for resuming the normal mode of the computation unit.

17. The circuit arrangement of claim 16, further comprising:

a first multiplexer for loading, into the at least one intermediate memory, the content of the at least one register which contains the memory address of the program executed;

a second multiplexer for loading, into the at least one register, the content of the at least one intermediate memory which corresponds to the memory address that is to be checked for the program memory.

18. The circuit arrangement of claim 16, further comprising:

a first multiplexer for storing, in the at least one intermediate register, the content of the at least register which was incremented by the adder;

a second multiplexer for loading, into the at least one register, the content of the at least intermediate memory.

* * * * *

UNITED STATES PATENT AND TRADEMARK OFFICE
CERTIFICATE OF CORRECTION

PATENT NO.       : 8,464,100 B2  
APPLICATION NO.  : 12/735530  
DATED            : June 11, 2013  
INVENTOR(S)      : Pletinckx et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 312 days.

Signed and Sealed this
Eighth Day of September, 2015

Michelle K. Lee
*Director of the United States Patent and Trademark Office*